Patented Sept. 20, 1927.

1,642,754

UNITED STATES PATENT OFFICE.

FELIX SINGER, OF BERLIN-CHARLOTTENBURG, GERMANY.

STONEWARE OF HIGH RESISTANCE AGAINST THE PERFORATING POWER OF ELECTRICAL SPARKS AND MAKING THE STONEWARE.

No Drawing. Application filed December 18, 1926, Serial No. 155,761, and in Germany November 13, 1925.

The present invention refers to ceramic bodies of high electrical resistance, such bodies being used as insulators for electrical conduits or lines.

The invention consists in producing ceramic masses containing a plurality of titanium compounds. These masses have about three times the electrical resistance that ordinary stoneware has, the latter having a perforating resistance of about 3000 volt/cm, the new masses having a resistance of about 10000–12000 volt/cm. Such ceramic masses are obtained by adding one or more titanium compounds to the ceramic substances to be fired, and firing the masses at definite temperatures and for a definite time so that the cooled masses contain a plurality of titanium compounds, both crystallized and amorphous, or several oxides or titanates. The final result is checked by making thin grounded sections from the burnt masses and examining them microscopically, the different colors showing that various titanium compounds in a different physical state are present. If this result has been obtained, the temperature and time of firing is correct. Otherwise the temperature and then the duration of firing or both are varied until the formation of different forms of titanium compounds in the stoneware masses, chemically and physically, is obtained.

Suitable titanium compounds for addition to the ceramic mixtures are titanium dioxide (in the form of rutil), brookite, anatat, titaniumsequioxide, titanates such as perowskite (calciumtitanate), aluminumtitanate, titanate of iron, polytitanates or titanium-containing clays or titanium glasses such as found in basalt, lava, and other volcanic rocks.

Suitable ceramic mixes for the manufacture of insulating material of this type are shown in the following examples:

*Example 1.*

| | Parts by weight. |
|---|---|
| Clay | 30–80 |
| Rutil | 0.1–10 |
| Quartz | 0–50 |

*Example 2.*

| | Parts by weight. |
|---|---|
| Clay | 30–80 |
| Calciumtitanate | 0.1–10 |
| Quartz | 0–50 |
| Feldspar | 0–50 |

*Example 3.*

| | |
|---|---|
| Clay | 30–80 |
| Quartz | 0–50 |
| Feldspar | 0–50 |
| Sand with 10% $TiO_2$ | 1–50 |

*Example 4.*

| | |
|---|---|
| Clay | 30–80 |
| Titanium glasses consisting of volcanic rocks | 1–30 |
| Quartz | 0–50 |
| Feldspar | 0–50 |

In using the novel method, the materials are ground and screened, and the mixture is moulded as for insulators and such like and is burnt at temperatures of about 1–15 S. C. during 24–120 hours, using first an oxidizing and then a reducing flame.

However, the firing procedure may be reversed, or, in certain cases, the flame may be oxidizing only. The firing process must not, however, be limited to a reducing fire only.

I claim:

1. A ceramic insulator comprising fired clay and a plurality of titanium compounds in different physical states.

2. A ceramic insulator comprising fired clay and titanium compounds in both crystallized and amorphous state.

3. The process of preparing ceramic insulators consisting in adding titanium compounds to the ceramic mix and burning the same with an oxidizing flame and with a reducing flame to form both crystalline and amorphous titanium compounds.

In testimony whereof I hereunto affix my signature.

FELIX SINGER.